(12) United States Patent
Kienzle et al.

(10) Patent No.: US 9,846,536 B2
(45) Date of Patent: Dec. 19, 2017

(54) COMPOSITION OF HANDWRITTEN MESSAGES ON MOBILE COMPUTING DEVICES

(71) Applicant: Microsoft Corporation, Redmond, WA (US)

(72) Inventors: Wolf Kienzle, Bellevue, WA (US); Kenneth Paul Hinckley, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 778 days.

(21) Appl. No.: 13/716,203

(22) Filed: Dec. 17, 2012

(65) Prior Publication Data
US 2014/0171153 A1 Jun. 19, 2014

(51) Int. Cl.
*G06F 3/0488* (2013.01)
*G06K 9/22* (2006.01)
*G06F 3/023* (2006.01)

(52) U.S. Cl.
CPC ........ *G06F 3/04883* (2013.01); *G06F 3/0237* (2013.01); *G06K 9/222* (2013.01)

(58) Field of Classification Search
CPC ............ H04W 52/0267; G06F 3/04883; G06F 3/0237; G06K 9/222
See application file for complete search history.

(56) References Cited

U.S. PATENT DOCUMENTS

| | | | |
|---|---|---|---|
| 5,796,866 A | 8/1998 | Sakurai et al. | |
| 5,870,492 A | 2/1999 | Shimizu et al. | |
| 6,944,472 B1 | 9/2005 | Ishigami | |
| 7,003,308 B1 * | 2/2006 | Fuoss | G06F 3/04883 345/173 |
| 7,177,473 B2 | 2/2007 | Aharonson | |
| 7,567,239 B2 | 7/2009 | Seni | |

(Continued)

FOREIGN PATENT DOCUMENTS

| | | | | |
|---|---|---|---|---|
| CN | 2011077942 | * | 6/2012 | ......... G06F 3/04883 |
| EP | 2386984 A2 | | 11/2011 | |

(Continued)

OTHER PUBLICATIONS

Cui, et al., "Stroke Break Analysis: A Practical Method to Study Timeout Value for Handwriting Recognition Input", Retrieved at <<http://research.nokia.com/files/p263-cui.pdf>>, 7th International Conference on Human Computer Interaction with Mobile Devices & Services, Sep. 2005, pp. 1-4.

(Continued)

*Primary Examiner* — Joseph Dean, Jr.
(74) *Attorney, Agent, or Firm* — Medley, Behrens & Lewis, LLC

(57) ABSTRACT

Technologies pertaining to composing, displaying, and/or transmitting handwritten content through utilization of a touch-sensitive display screen of a mobile computing device are described herein. A user of the mobile computing device can set forth strokes on the touch-sensitive display screen, one on top of another, wherein such strokes correspond to different handwritten characters. Stroke segmentation can be undertaken to determine which strokes correspond to which characters in a handwritten sequence of characters.

20 Claims, 17 Drawing Sheets

(56) References Cited

U.S. PATENT DOCUMENTS

| | | | |
|---|---|---|---|
| 2002/0071607 A1 | 6/2002 | Kawamura et al. | |
| 2003/0072490 A1* | 4/2003 | Pettersson | G06K 9/222 382/186 |
| 2012/0299931 A1* | 11/2012 | Monahan | G06F 3/04883 345/441 |
| 2013/0314363 A1* | 11/2013 | Zhen | G06F 3/018 345/173 |

FOREIGN PATENT DOCUMENTS

| | | |
|---|---|---|
| EP | 2650767 A1 | 10/2013 |
| WO | 2012/075821 A1 | 6/2012 |

OTHER PUBLICATIONS

Zou, et al., "Overlapped Handwriting Input on Mobile Phones", Retrieved at <<http://ieeexplore.ieee.org/stamp/stamp.jsp?tp=&arnumber=6065337>>, International Conference on Document Analysis and Recognition, Sep. 2011, pp. 1-5.

Srihari, S., "Handwriting Recognition, Automatic", Retrieved at <<http://www.cedar.buffalo.edu/~srihari/papers/ELL2.pdf>>, Encyclopedia of Language & Linguistics, Retrieved Date: Oct. 5, 2012, pp. 1-9.

Agrawal, et al., "Using Mobile Phones to Write in Air", Retrieved at <<http://synrg.ee.duke.edu/papers/mobi198-agrawal.pdf>>, 9th International Conference on Mobile Systems, Applications, and Services, Jun. 2011, pp. 1-14.

Barath, et al., "A Novel Handwriting-based Text Input for Pen , and Touch Interfaces", Retrieved at <<http://www.hpl.hp.com/india/documents/papers/freepadnovelhandwritinginput.pdf>>, In Proc. Intelligent User Interfaces (IUI), Jan. 2008, pp. 1-4.

Llorens, et al., "The UJIpenchars Database: A Pen-Based Database of Isolated Handwritten Characters", Retrieved at <<http://www.lrec-conf.org/proceedings/lrec2008/pdf/658_paper.pdf>>, In Proc. Language Resources and Evaluation (LREC), 2008, pp. 2647-2651.

Shimodaira, et al., "On-line Overlaid-Handwriting Recognition Based on Substroke HMMs", Retrieved at <<http://www.cstr.ed.ac.uk/downloads/publications/2003/Shimodaira2003ICDAR.pdf>>, Intl. Conf. Document Analysis and Recognition, 2003, pp. 1-5.

Freund, et al., "A Decision-Theoretic Generalization of On-Line Learning and an Application to Boosting", Retrieved at <<http://www.face-rec.org/algorithms/Boosting-Ensemble/decision-theoretic_generalization.pdf>>, Journal of Computer and System Sciences vol. 55, 1997, pp. 119-139.

Cocoa Box Design, LLC, Retrieved at <<http://web.archive.org/web/20100419173823/http://www.cocoabox.com/>>, Retrieved on Dec. 13, 2012, pp. 1-2.

www.geewhizstuff.com, Retrieved on Dec. 13, 2012, pp. 1-4.

MacKenzie, et al., "Phrase Sets for Evaluating Text Entry Techniques", Retrieved at <<http://www.yorku.ca/mack/chi03b.pdf, In CHI Extended Abstracts, 2003, pp. 754-755.

Ritter, et al., "Unsupervised Modeling of Twitter Conversations", Retrieved at <<http://homes.cs.washington.edu/~aritter/twitter_chat.pdf>>, In Human Language Technoology, 2010, pp. 172-180.

Rabiner, "A Tutorial on Hidden Markov Models and Selected Applications in Speech Recognition", Proceedings of the IEEE, 77(2), 1989, pp. 257-268.

Saponas, et al., "PocketTouch: Through-Fabric Capacitive Touch Input", Retrieved at <<http://research.microsoft.com/en-us/um/people/benko/publications/2011/pockettouch%20-%20uist2011%20-%20saponasharrisonbenko.pdf>>, In UIST 2011, 2011, pp. 1-5.

Tinwala, et al., "Eyes-Free Text Entry on a Touchscreen Phone", Retrieved at <<http://www.cse.yorku.ca/course_archive/2008-09/W/4441/submission.pdf>>, Retrieved on Dec. 13, 2012, pp. 1-11.

"International Search Report & Written Opinion for PCT Patent Application No. PCT/US2013/075718", dated Mar. 13, 2014, Filed Date: Dec. 17, 2013, 9 Pages.

* cited by examiner

COMPOSITION OF HANDWRITTEN MESSAGES ON MOBILE COMPUTING DEVICES

BACKGROUND

Mobile computing devices in general, and mobile telephones in particular, have evolved from being special-purpose computing devices (such as communications devices and electronic readers) to multi-purpose computing devices that are fast becoming ubiquitous. In an example, a user of a mobile telephone can receive an e-mail by way of an e-mail application installed thereon, download an attachment (e.g., a word processing document) from the e-mail server, open the attachment in a word processing application, modify the word processing document, save the word processing document to persistent storage of the mobile telephone, upload the word processing document to a web-based storage system, and share said document with other individuals chosen by the user by way of a social networking application installed on the mobile telephone. Currently, there are several hundred thousand computer-executable applications that can be retrieved from network-accessible application stores and installed on a mobile computing device. Such applications can relate to gaming that may be undertaken by way of the mobile computing device, content creation and editing, communications applications, social networking applications, applications that deliver news to a user of the mobile computing device, etc.

While applications for content creation and editing have been designed for mobile computing devices in general, and in particular for mobile telephones, limitations that are inherent in these mobile computing devices can render content creation thereon somewhat difficult. In an example, if a user desires to generate a text message for transmittal to a contact of such user, typically a software keyboard is presented on a touch-sensitive display of the mobile computing device, and the user selects particular characters that are desirably included in the message from the software keyboard by touching the touch-sensitive display at certain locations with a finger. Due to the relatively small size of touch-sensitive displays on mobile computing devices, size of buttons that are representative of characters on the soft keyboard can be relatively small, resulting in errors caused by inadvertently selecting incorrect characters. Additionally, multitasking is difficult when generating content, as the user must pay particular attention to ensure that appropriate keys on the software keyboard are selected. Thus, for example, it is difficult to walk and generate a text message at the same time. Still further, text messages may feel somewhat impersonal to a recipient thereof, as each text message received from each contact of the user will typically have identical fonts, sizes, and the like.

SUMMARY

The following is a brief summary of subject matter that is described in greater detail herein. This summary is not intended to be limiting as to the scope of the claims.

Described herein are various technologies pertaining to generation, display, and/or transmittal of handwritten messages through utilization of a mobile computing device, such as a mobile telephone. The mobile computing device comprises a touch-sensitive display screen, which may be relatively limited in size. The user of the mobile computing device can, through utilization of the touch-sensitive display screen, set forth strokes that are at least portions of respective characters, one on top of the other. The strokes can be segmented to ascertain which stroke(s) belong to respective characters, and resultant characters can be displayed on the touch-sensitive display as a sequence of characters (e.g., a word). The sequence of characters is displayed to represent the handwriting of the user of the mobile computing device as set forth in the strokes of the user when interacting with the touch-sensitive display. A stroke, as the term is used herein, is the uninterrupted movement of an input mechanism (e.g., a finger) of the user over the touch sensitive display screen, where the user does not lift the input mechanism from the touch-sensitive display screen.

It can therefore be ascertained that, depending on the writer, some characters can be generated by a single stroke, some characters can be generated by two strokes, some characters can be generated by three strokes, etc. For instance, typically a user will employ two strokes to write a lowercase "i", while using a single stroke to write a lowercase "o". As the user is setting forth strokes to generate characters on the touch-sensitive display screen of the mobile computing device, such characters can be displayed on the touch-sensitive display screen, wherein the characters are displayed as handwritten characters reflecting the handwriting of the user.

In an exemplary embodiment, the user can set forth a first stroke on the touch-sensitive display screen in a particular region, wherein the first stroke is intended by the user to be at least a portion of a first handwritten character. Subsequently, the user can set forth a second stroke on the touch-sensitive display screen in the particular region, such that the first stroke and the second stroke at least partially overlap, where in the second stroke is intended by the user to be at least a portion of a second handwritten character that is desirably displayed immediately adjacent to the first handwritten character (to form a sequence of handwritten characters). Based at least in part upon the first stroke and the second stroke, the first handwritten character and the second handwritten character can be displayed adjacent to one another on the touch-sensitive display screen of the mobile computing device. Further, the user need not set forth some intermediate gesture to inform the mobile computing device that the first stroke belongs to the first character and that the second stroke belongs to the second character. In other words, the user need not set forth an intermediate gesture to inform the mobile computing device of when individual characters are completed. Rather, stroke segmentation (the process of determining that the first stroke belongs to the first character and the second stroke belongs to the second character) can be undertaken automatically, thus allowing the user to set forth characters on the touch-sensitive display screen in an intuitive manner.

Features pertaining to editing a sequence of handwritten characters set forth by the user are also described herein. In an example, an error may occur during stroke segmentation, such that displayed handwritten characters are not reflective of the intent of the user. When the user recognizes the error, the user can set forth a gesture to inform the mobile computing device of such error. In an example, the gesture may be a tap of the finger on a character or characters that have been impacted by the stroke segmentation error. Responsive to receiving such gesture, the mobile computing device can identify a most probable correction and automatically correct the stroke segmentation error. In another exemplary embodiment, responsive to the mobile computing device receiving such gesture, a set of most probable selectable corrections can be set forth and the user can select a desired correction.

In another example, the user may wish to delete a most recent stroke, a most recently entered character, or a most recently entered word (e.g., the user may change her mind with respect to portions of a handwritten sentence or phrase). The user can set forth a gesture to indicate that a most recent stroke, character, or word is desirably deleted, and responsive to detecting such gesture, the requested correction can be automatically undertaken. For instance, such gesture may be the transition (swipe) of a finger in a certain direction or directions, a spoken(voice) command, or the like.

In another exemplary embodiment, the user may desirably include a freeform drawing as a portion of handwritten content. The user may set forth a gesture to indicate that subsequently received strokes are not portions of characters, and thus inform the mobile computing device that stroke segmentation is not to occur for immediately subsequently entered strokes. Subsequent to setting forth such gesture, the user can create a freeform drawing by interacting with the touch-sensitive display screen of the mobile computing device. The user can set forth a subsequent gesture, or press a selectable button, to indicate that the freeform drawing has been completed.

The technologies described above can be employed in a variety of applications. For instance, a computer-executable messaging application can be configured to identify and transmit handwritten messages created in the manner described above. In another exemplary embodiment, a computer-executable application that allows for documents or images to be annotated can be configured with the aforementioned technologies, thereby allowing a reviewer of a document or image to annotate portions thereof, with handwritten annotations.

Other aspects will be appreciated upon reading and understanding the attached figures and description.

DETAILED DESCRIPTION

Figure 1:
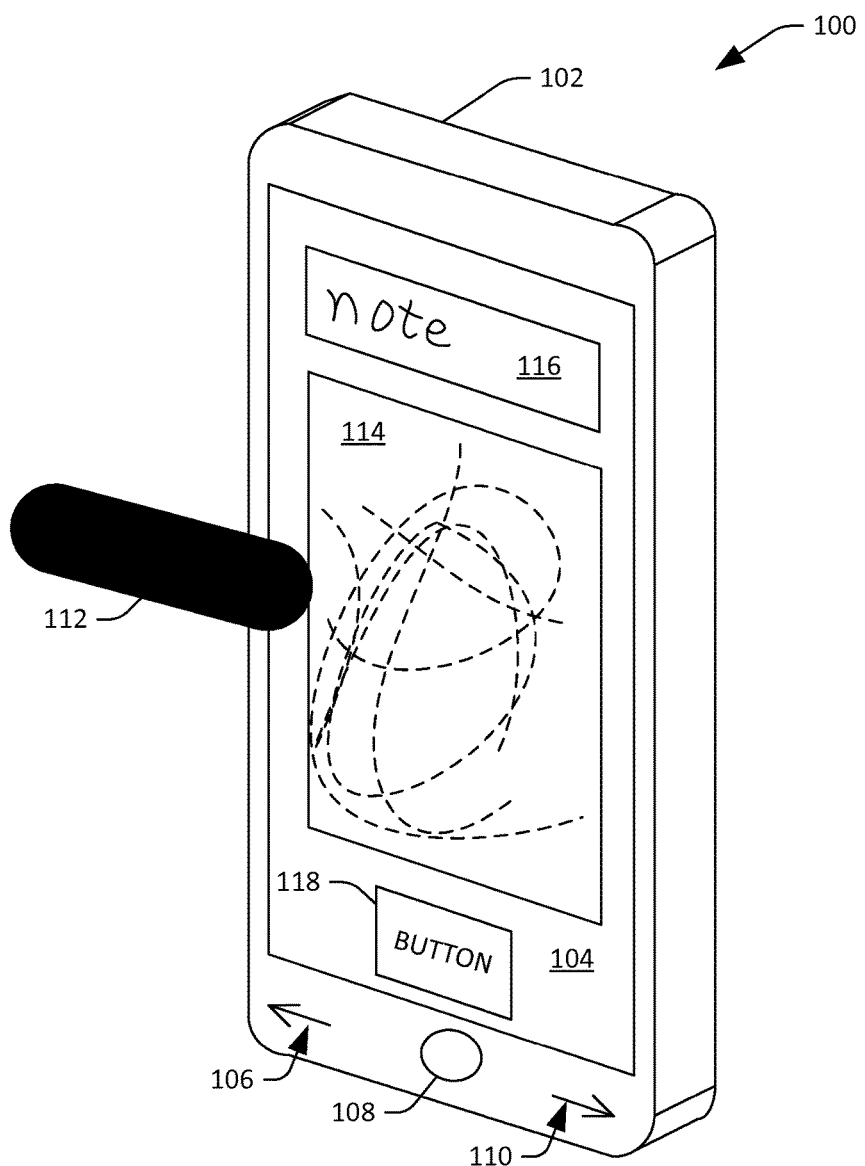
FIG. 1 illustrates an exemplary mobile computing device that is configured to compose sequences of handwritten characters.

Various technologies pertaining to composition, display, and/or transmittal of handwritten content through utilization of a touch-sensitive display screen of a mobile computing device will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

With reference now to FIG. 1, an exemplary mobile computing device 100 that is configured to compose handwritten content (e.g., messages or annotations) is illustrated. While the mobile computing device 100 is shown as being a mobile telephone, it is to be understood that the mobile computing device 100 may be some other suitable mobile computing device, such as a tablet computing device (sometimes referred to as a slate computing device), an ultrabook, a portable media player, or the like. The mobile computing device 100 includes a housing 102 that houses circuitry/components that facilitate various functionalities that can be undertaken by way of the mobile computing device 100. Such circuitry can include a wireless chipset, at least one processor, a memory, a system on a chip configuration, a cluster on a chip configuration, an amplifier, a microphone, amongst other circuitry. A touch-sensitive display screen 104 resides in an aperture of the housing 102, wherein a user of the mobile computing device 100 can interact with the mobile computing device 100 by way of the touch-sensitive display screen 104. The housing 102 may also have a plurality of user-selectable buttons 106-110 thereon, wherein the user can further interact with the mobile computing device 100 through employment of the plurality of buttons 106-110.

In an exemplary embodiment, the touch sensitive display screen 104 can be relatively small in size. For instance, size of the touch-sensitive display screen 104 may be on the order of 3½ inches in width by 5 inches in height. Due to the relatively small size of such screen, it is difficult to compose handwritten content (messages or annotations) by way of gestures set forth by a user via an input mechanism 112 on the touch sensitive display screen 104. The input mechanism 112 typically is a finger of the user, but it is to be understood that the input mechanism 112 may be a stylus or other suitable input mechanism.

Technologies described herein allow the user of the mobile computing device 100 to employ a relatively large portion of the touch-sensitive display screen 104 when composing each character of a sequence of handwritten characters that is desirably displayed and/or transmitted. Each handwritten character is made up of a stroke or sequence of strokes. A stroke, as the term is used herein, is an uninterrupted movement of the input mechanism 112 over the touch-sensitive display screen while maintaining contact with the touch-sensitive display screen 104. Thus, a stroke begins when the input mechanism 112 comes into contact with the touch-sensitive display screen 104 and ends when contact between the input mechanism 112 and the touch-sensitive display screen 104 ceases.

In the example shown in FIG. 1, the touch-sensitive display screen 104 comprises an input region 114, wherein the user can set forth strokes corresponding to handwritten characters inside the input region 114. As shown, the user, by interacting with the touch-sensitive display screen 104, has entered a sequence of strokes that are set forth by the user to compose the sequence of handwritten characters "note". Thus, at a first point in time, the user uses the input mechanism 112 to set forth a first stroke in the input region 114, wherein the first stroke forms an entirety of the letter "n". Immediately thereafter, and without indicating to the mobile computing device 100 that the handwritten character "n" has been completed, the user generates a second stroke in the input region 114 corresponding to the handwritten character "o". As shown, the first stroke corresponding to the handwritten character "n" and the second stroke corresponding to the handwritten character "o" at least partially overlap in the input region 114. The touch-sensitive display screen 104 may also comprise a display region 116. As the user, through interaction of the input mechanism 112 with the input region 114 of the touch-sensitive display screen 104, composes handwritten characters by performing strokes, the display region 116 can display a sequence of handwritten characters. Accordingly, in an example, as the user is setting forth strokes in the input region 114, the display region 116 can display the sequence of handwritten characters being composed by the user.

Continuing with this example, the user can set forth a third stroke, which corresponds to the substantially vertical portion of the letter "t". Immediately thereafter, the user can set forth a fourth stroke to complete the letter "t", wherein the fourth stroke is a substantially horizontal stroke that crosses the third stroke. Again, the third and fourth strokes that correspond to the letter "t" can at least partially overlap strokes corresponding to the letters "n" and "o" in the input region 114. Finally, the user can set forth a fifth stroke corresponding to the handwritten character "e", wherein such stroke at least partially overlaps at least one stroke corresponding to at least one of the previously composed handwritten characters. As will be described in greater detail below, the mobile computing device 100 can be configured to identify character boundaries in connection with untangling strokes and rendering the handwritten message in the display region 116. This can be undertaken through stroke segmentation, which is distinguishable from handwriting recognition. That is, the mobile computing device 100 need not recognize that certain strokes belong to particular handwritten characters; rather, the mobile computing device 100 can be configured to detect boundaries of characters and untangle such characters to be rendered in the display region 116 of the touch sensitive display screen 104. Thus, the mobile computing device 100 can be configured to determine that a first subset of strokes corresponds to a first handwritten character and that a second subset of strokes corresponds to a second handwritten character, without having to identify the respective characters. Further, since the mobile computing device 100 need not be configured to perform handwriting recognition, a dictionary is not necessary. For example, the out-of dictionary words (e.g., "whooah") will not be mistaken for misspellings and replaced with in-dictionary words (e.g., "whose"), thereby making expressive spelling less cumbersome. An exemplary technique for performing stroke segmentation to detect boundaries is set forth below.

The touch-sensitive display screen 104 may further comprise a button 118, which can be selected by the user by causing the input mechanism 112 to contact the touch-sensitive display screen 104 at the location of the button 118. In an exemplary embodiment, the displayed sequence of handwritten characters in the display region 116 can be shown for the purposes of message transmittal, and depression of the button 118 can cause the sequence of handwritten characters to be transmitted to a contact of the user of the mobile computing device 100. In another exemplary embodiment, the user of the mobile computing device 100 may desirably annotate an image or document with the sequence of handwritten characters shown in the display region 116. In such an embodiment, the user can select a particular portion of the image or document that is desirably annotated, which can cause the graphical user interface shown in FIG. 1 to be presented. Subsequent to the user of the mobile computing device 100 completing the annotation, the user can select the button 118, which can cause the annotation to be applied to the document or image at the location therein selected by the user.

While the example shown in FIG. 1 depicts each character in the sequence of handwritten characters shown in the display region 116 as being generated on top of one another, it is to be understood that the technologies described herein are not so limited. For example, if the input region 114 is of sufficient size, the user can set forth strokes corresponding to different handwritten characters in non-overlapping regions. Thus, for example, user can set forth a stroke corresponding to the letter "n" on a left portion of the input region 114, and the user can set forth a stroke corresponding to the letter "o" on a right portion of the region 114, such that the first stroke and the second stroke are non-overlapping. Additionally, the sequence of handwritten characters shown in the display region 116 is not limited to a single word. The user of the mobile computing device 100, in an exemplary embodiment, can set forth a gesture that indicates that a subsequently received stroke corresponds to a next word in a message or annotation. Alternatively, the user can set forth a spoken command to indicate that an immediately subsequent stroke corresponds to another word in a message or annotation shown in the display region 116. Furthermore, size of the display region 116 can alter as the message or annotation grows. Additionally or alternatively, size of handwritten characters shown in the display region 116 can shrink to allow a message or annotation to grow in size and still be displayed in the display region 116. Moreover, while the mobile computing device 100 is shown as being employed when the touch-sensitive display screen 104 is oriented in a portrait mode relative to the user, it is to be understood that techniques described herein can be employed in landscape mode. Further, the user can select color and/or thickness of lines of characters in a sequence of handwritten characters shown in the display region 116.

Figure 2:
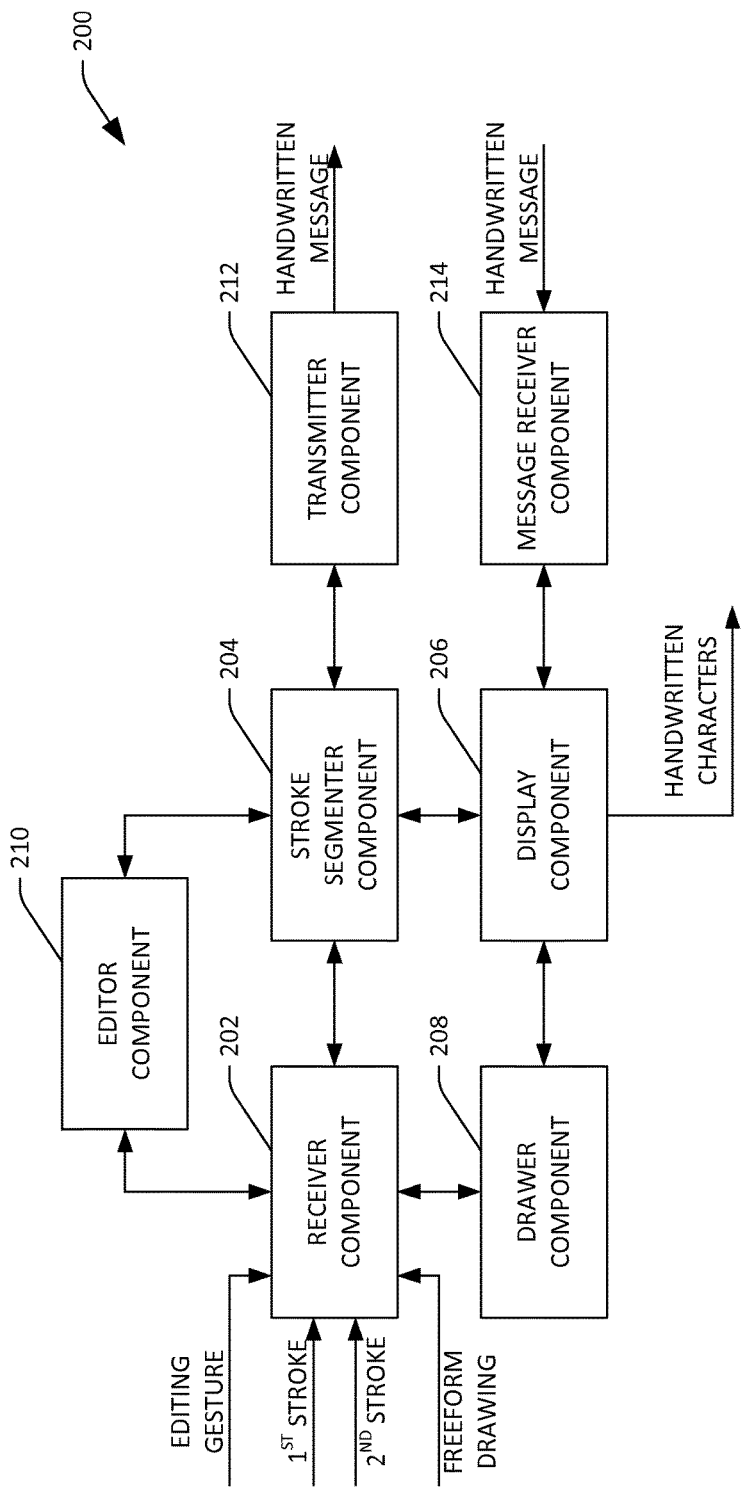
FIG. 2 is a functional block diagram of an exemplary system that facilitates composing, editing, and/or transmitting sequences of handwritten characters.

Now referring to FIG. 2, an exemplary system 200 that facilitates composing, displaying, and/or transmitting handwritten content through utilization of a mobile computing device is illustrated. For example, the mobile computing device 100 can comprise the system 200. The system 200 comprises a receiver component 202 that receives a first stroke detected as being set forth by a user of the mobile computing device 100 on the touch-sensitive display screen 104. The first stroke corresponds to a first handwritten character that is desirably composed by the user of the mobile computing device 100. Further, as described above, the first stroke can be detected as occurring in the input region 114 of the touch-sensitive display screen 104. The receiver component 202 additionally receives a second stroke detected as being set forth on the touch-sensitive display screen 104 by the user of the mobile computing device 100. The second stroke corresponds to a second handwritten character desirably composed by the user, wherein the second handwritten character is desirably displayed immediately adjacent to the first handwritten character. Further, the second stroke can be detected as occurring in the input region 114 of the touch-sensitive display screen 104, such that at least a portion of the first stroke and a portion of the second stroke overlap.

A stroke segmenter component 204 is in communication with the receiver component 202 and performs stroke segmentation over the first stroke and the second stroke to detect a boundary between the first handwritten character and the second handwritten character. That is, the stroke segmenter component 204 determines that the first stroke corresponds to the first handwritten character and the second stroke corresponds to the second handwritten character (without needing to explicitly identify the first handwritten character or the second handwritten character). With more particularity, the stroke segmenter component 204 detects character boundaries that are used to untangle and render a handwritten sequence of characters (message or annotation). The stroke segmenter component 204 can segment strokes within a sequence of characters (e.g., a word) utilizing an exemplary technique described below.

The system 200 can further comprise a display component 206 that is in communication with the stroke segmenter component 204, wherein the display component displays the first handwritten character and the second handwritten character immediately adjacent to one another in the display region 116 of the touch-sensitive display screen 104 as a portion of a handwritten message or annotation. It is to be understood that the handwritten content reflects the actual handwriting of the user of the mobile computing device 100 as detected in the input region 114 of the touch-sensitive display screen 104.

The system 200 may optionally comprise a drawer component 208 that is in communication with the receiver component 202. The receiver component 202 can receive an indication from the user of the mobile computing device 100 that the user desires to include a freeform drawing in the handwritten content. Thus, the user indicates that an immediately subsequently proffered stroke is not a portion of a handwritten character, and thus indicates that the stroke segmenter component 204 is not to perform stroke segmentation on subsequently proffered strokes. The display component 206 displays the subsequently received strokes in the display region 116 as they are set forth in the input region 114 by the user. Thus, the display component 206 receives such output from the drawer component 208 and causes the freeform drawing proffered by the user to be displayed in the display region 116, potentially together with other handwritten content. The indication received by the receiver component 202 that the user of the mobile computing device 100 desires to include a freeform drawing in the handwritten note may be a spoken command, a gesture, a touch of a button on the touch-sensitive display screen 104, a selection of one of the buttons 106-110 on the housing 102 of the mobile computing device 100, or the like.

The system 200 may further optionally comprise an editor component 210 that is in communication with the receiver component 202 and the stroke segmenter component 204. In an exemplary embodiment, the stroke segmenter component 204 may have improperly segmented strokes received by the user, such that at least one character in the sequence of handwritten characters displayed in the display region 116 is incorrect. This may occur, for example, when the touch-sensitive display screen 104 misidentifies a stroke set forth by the input mechanism 112 of the user, when the user inadvertently includes or fails to include a stroke of a handwritten character, or for some other reason. Pursuant to an example, the user can set forth a gesture to indicate that at least one handwritten character displayed in the display region 116 is incorrect, and the editor component 210 can receive such gesture. Pursuant to an example, and as will be shown below, the gesture may be a single tap on the incorrect character or characters shown in the display region 116. The editor component 210 can be in communication with the stroke segmenter component 204, which can output a most probable correction for the incorrect handwritten character or characters. Such correction can be provided to the display component 206, which can highlight the character or characters in the display region 116 that have been corrected.

With more particularity, when the editor component 210 is informed that a segmentation error has occurred at a particular location in the display region 116, the stroke segmenter component 204 can locate a most likely segmentation that differs at the particular location (e.g., the location of the user tap), while leaving other portions of the message or annotation displayed in the display region 116 unchanged.

In other embodiments, the user may wish to delete a most recently provided stroke, character, or word. For example, the user can set forth a command, which can be a gesture, or spoken word, to indicate to the editor component 210 that a most recently displayed stroke, character, or word is desirably removed from the message or annotation displayed in the display region 116. The display component 206 may then delete such stroke, character, or word in accordance with the command set forth by the user.

As noted above, the system 200 may optionally be employed in connection with a messaging application. Accordingly, the system 200 may optionally include a transmitter component 212 that can transmit a message displayed in the display region 116 of the touch sensitive display screen 104 to a contact of the user of the mobile computing device 100. Thus, for instance, the recipient of the message will receive the handwritten message as displayed in the display region 116. Likewise, the system 200 may comprise a message receiver component 214 that can receive a handwritten message transmitted to the user from a contact of the user. The message receiver component 214 is in communication with the display component 206, which can display the handwritten message on the touch-sensitive display screen 104 of the mobile computing device 100.

Figure 3:
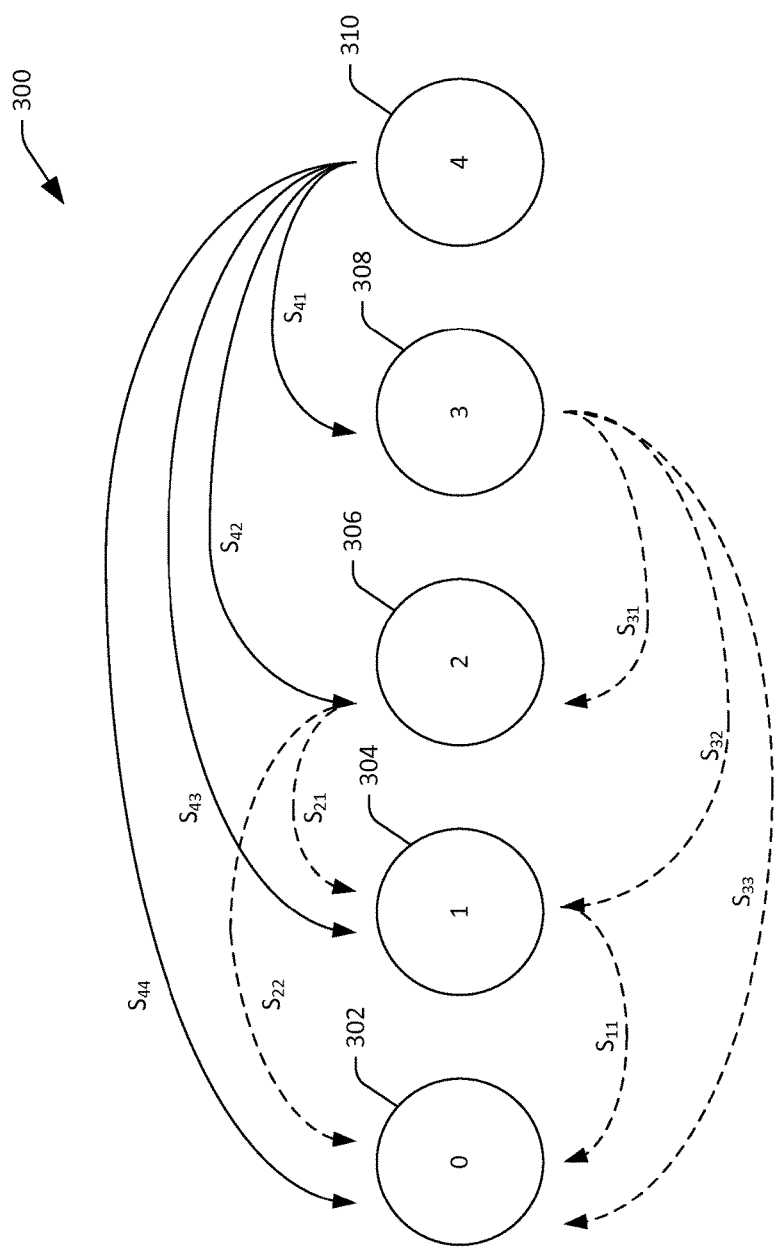
FIG. 3 is a state diagram illustrating an exemplary technique for performing stroke segmentation in connection with displaying handwritten characters on a display screen of a mobile computing device.

With reference now to FIG. 3, an exemplary stroke segmentation graph 300 that is set forth in connection with description of segmentation of strokes undertaken by the stroke segmenter component 204 is illustrated. The stroke segmentation graph 300 comprises a plurality of nodes 302-310. The stroke segmentation graph 300 can be employed to represent handwritten characters that are composed through 1-4 strokes. Any path from node 4 (node 310) to node 0 (node 302) represents a stroke segmentation, wherein the score of such segmentation is the sum of traversed edge weights, $s_{ik}$, and visited nodes mark character ends.

In an exemplary embodiment, it may be desirable to segment a word consisting of N strokes. For every stroke $i=1, \ldots, N$, four scores $s_{ik}$, $k=1, \ldots, 4$ can be computed, wherein each score describes how likely stroke i is the last stroke in a k-stroke character. FIG. 3 depicts a segmentation graph where N=4, and includes N+1 nodes; one node for each stroke $i=1, \ldots, N$ plus one extra start node 302 labeled 0, wherein the graph 300 includes directed edges pointing from each node back to its (up to) four predecessors. An edge from node i to node i-k corresponds to grouping strokes (i-k+1), ..., i into one character and is weighted by the corresponding score $s_{ik}$. A path from node N to node 0 represents a segmentation of the N strokes into characters. Predicting the most likely segmentation amounts to locating the path with the maximum sum of edge weights. This is a standard shortest path problem that can be solved efficiently using dynamic programming in O(N) time and space.

In an exemplary embodiment, the stroke segmenter component 204 can compute end of character scores as $s_{ik}=f_k(v_i)$, where $v_i$ is a vector of features describing stroke i and $f_k$ is a statistical model of how likely a stroke is the last one in a k-stroke character.

Pursuant to an example, the feature vector $v_i$ can include numerous values, including bounding box position for the stroke, dimensions, area, aspect ratio, stroke length, a multi-bin slope histogram, slopes at the beginning and end of the stroke, amongst others. The feature vector can also hold similar values for strokes neighboring in time in both directions. For example, the feature vector can hold similar values for two strokes neighboring in time in both directions (i-2), ..., (i+2), provided that such strokes exist (missing entries in $v_i$ can be set to some value, such as -1). Furthermore, bounding box features can be employed to ascertain the union and intersection of neighboring bounding boxes. Other features are also contemplated.

Boosted decision stumps can be employed for end of character models: $f_k(v_i)=\Sigma_{j=1}^{n}h_{jk}(v_i)$, e.g. sums of n step functions $h_{jk}$, on the individual dimensions of $v_i$. It is to be understood that other approaches for stroke segmentation are also contemplated.

Figure 4:
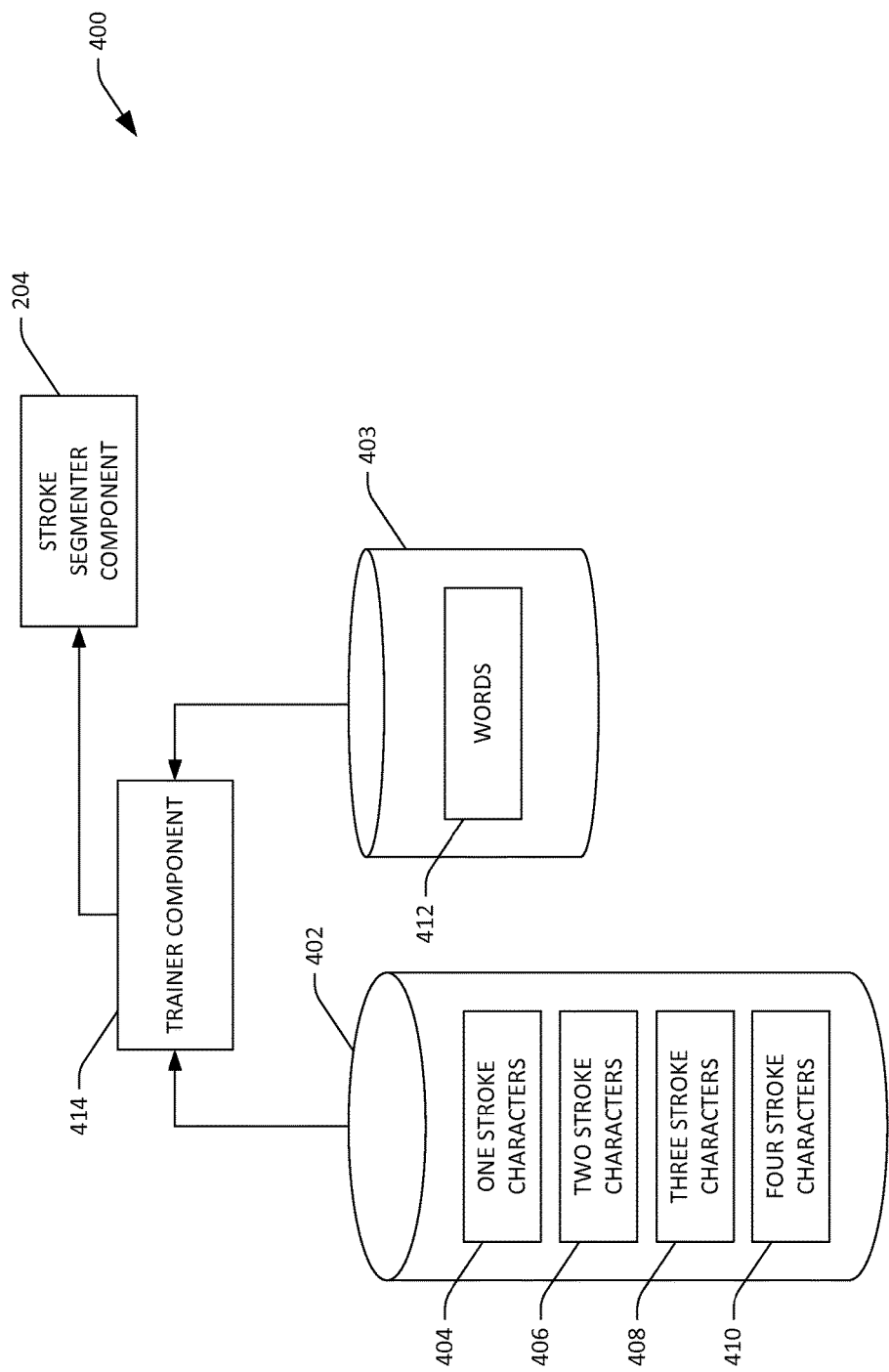
FIG. 4 is a functional block diagram of an exemplary system that facilitates training a computer-executable component to perform stroke segmentation in connection with displaying handwritten content on a display screen of a mobile computing device.

Now referring to FIG. 4, an exemplary system 400 that facilitates training the stroke segmenter component 204 is illustrated. The system 400 comprises a first data set 402 and a second data set 403. The first data set 402 includes a collection of one-stroke characters 404, a collection of two-stroke characters 406, a collection of three-stroke characters 408, and a collection of four-stroke characters 410. It is to be understood that, for instance, a character may fall into more than one of the sets 404-410 (depending on a number of strokes a writer used to generate the character). For example, a first user may compose a lowercase "t" with two strokes, while another user may compose a lowercase "t" with one stroke. The second data set 403 includes a plurality of words 412. For instance, such words 412 can be extracted as most popular or frequently used words from some sample data set (e.g., from a social networking application). A trainer component 414 can utilize the first data set 402 and the second data set 403 to build four statistical models corresponding to single stroke characters, two-stroke characters, three-stroke characters, and four-stroke characters, respectively, which are employed by the stroke segmenter component 204 when performing stroke segmentation. The trainer component 414 can simulate characters being placed on top of one another by extracting a random word from the words 412 and generating a stream of strokes corresponding to such word (one on top of the other), where every stroke is represented by a feature vector. Accordingly, a sequence of feature vectors is acquired. Position and size of simulated strokes can be randomly perturbed such that the mean and variance match data from the first set 402. By randomizing position and selecting words from the words 412, training data can be generated relatively cheaply.

Returning briefly to FIG. 3, correction of a segmentation error is described in greater detail. When the user of the mobile computing device 100 performs a gesture with respect to a character or characters that are displayed incorrectly in the display region 116 (a segmentation error), a closest sequence of characters (word) to the tap location can be located, and strokes for such word can be divided into three categories: 1) strokes for which the segmentation should change (within 5 mm of tap location); 2) strokes for which the segmentation may change (adjacent to should change strokes); and 3) everything else (where strokes should not change). Some threshold number (e.g., 32) of most likely segmentations can then be computed e.g., while leaving the strokes in category 3) unchanged. This can be achieved by removing edges from the segmentation graph (FIG. 3) that would lead to alternate segmentations for strokes in category 3) and finding the threshold number of best remaining paths. A best alternate segmentation can be defined as the feasible path that 1) changes at least one of the strokes that fall in category 1); and 2) has the smallest impact on strokes that fall into category 2). This rule favors corrections that are localized, but also allows larger areas to change if the local change requires change in the larger area.

Figure 5:
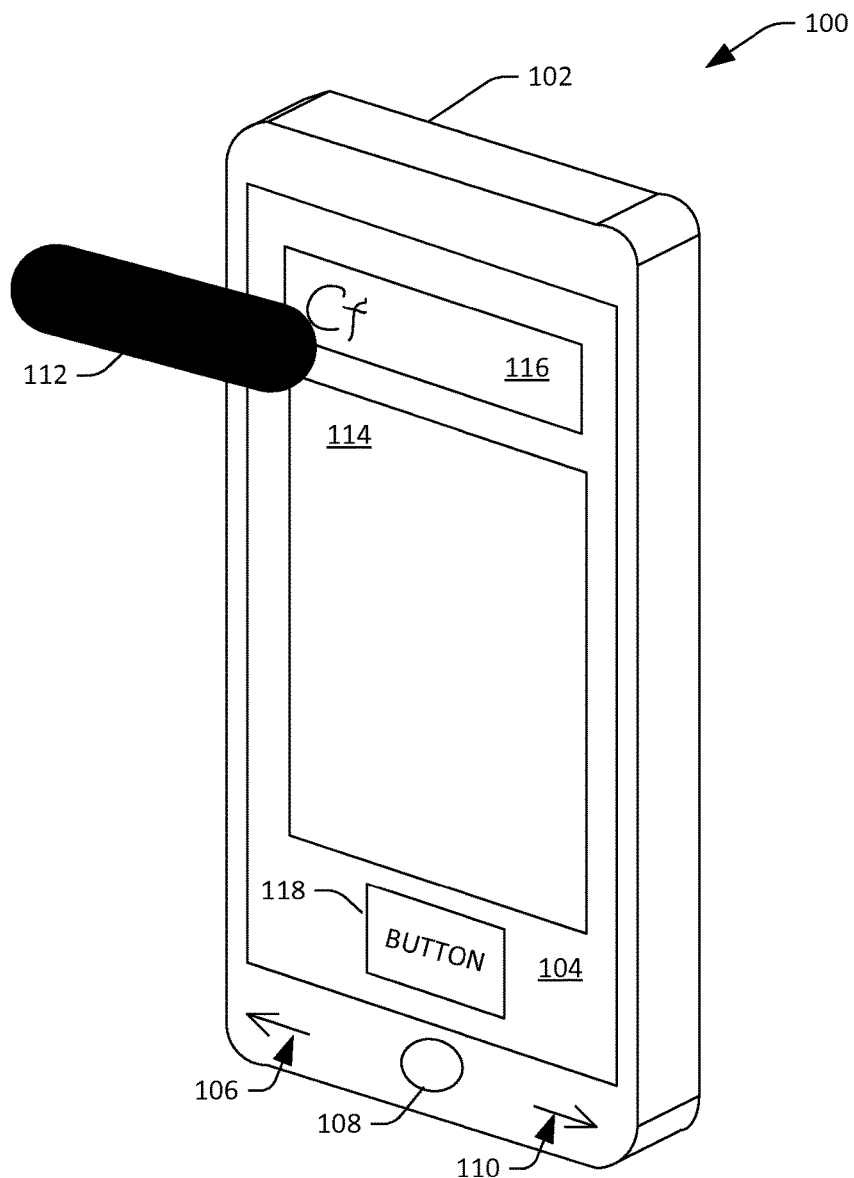
FIGS. 5-13 illustrate exemplary techniques for editing a sequence of handwritten characters that are composed using a mobile computing device.
Figure 6:
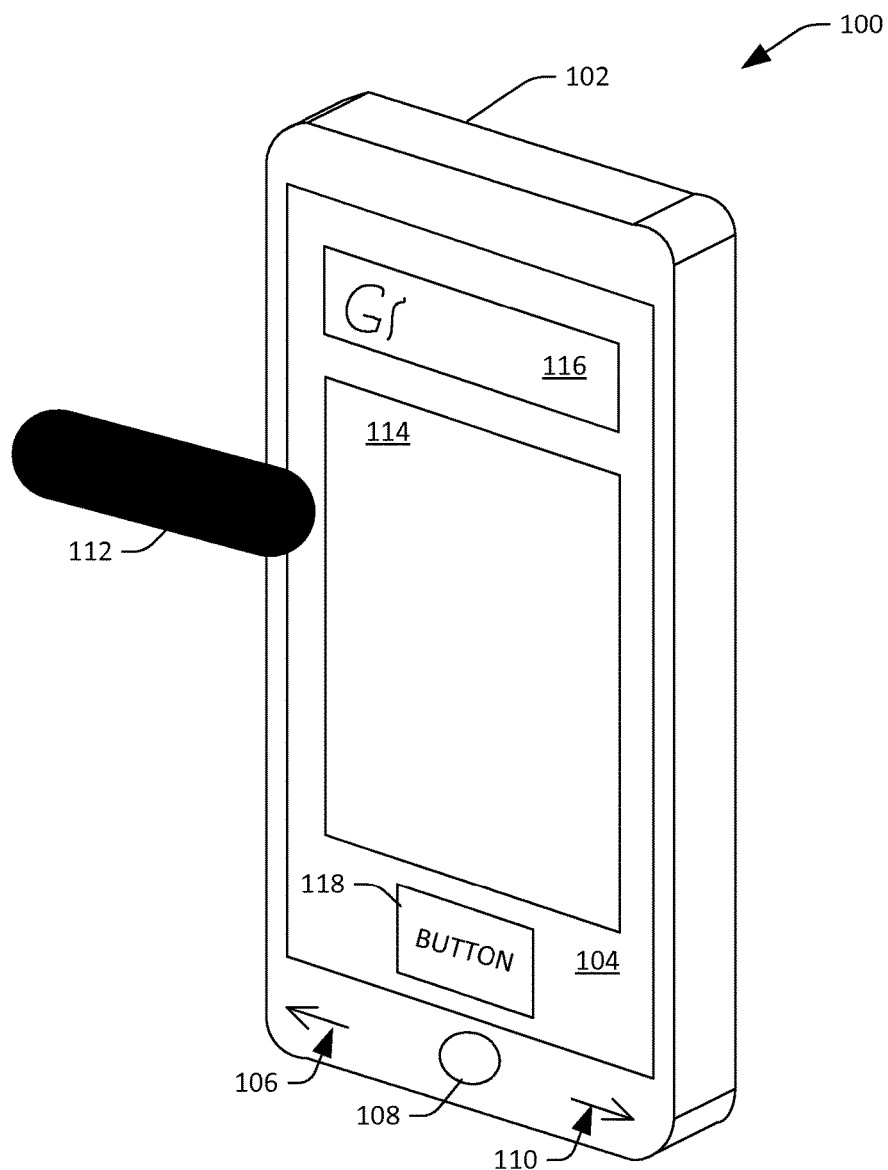

With reference to FIG. 5, the mobile computing device 100 is illustrated with at least one handwritten character being displayed improperly in the display region 116. In an example, the user of the mobile computing device 100 may desire to generate the handwritten word "Gift". A segmentation error, however, may cause the mobile computing device 100 improperly display the characters "Ct". To correct the segmentation error, the user can tap the touch-sensitive display screen 104 at the location of the segmentation error with the input mechanism 112. Other input gestures that may also be employed, include encircling characters subject to the segmentation error, swiping over the characters subject to the segmentation error, or a spoken command. Referring briefly to FIG. 6, the segmentation error is corrected utilizing the technique described above. Furthermore, the characters subjected to correction can be highlighted in some fashion to inform the user of the mobile computing device 100 of which characters were altered.

Figure 7:
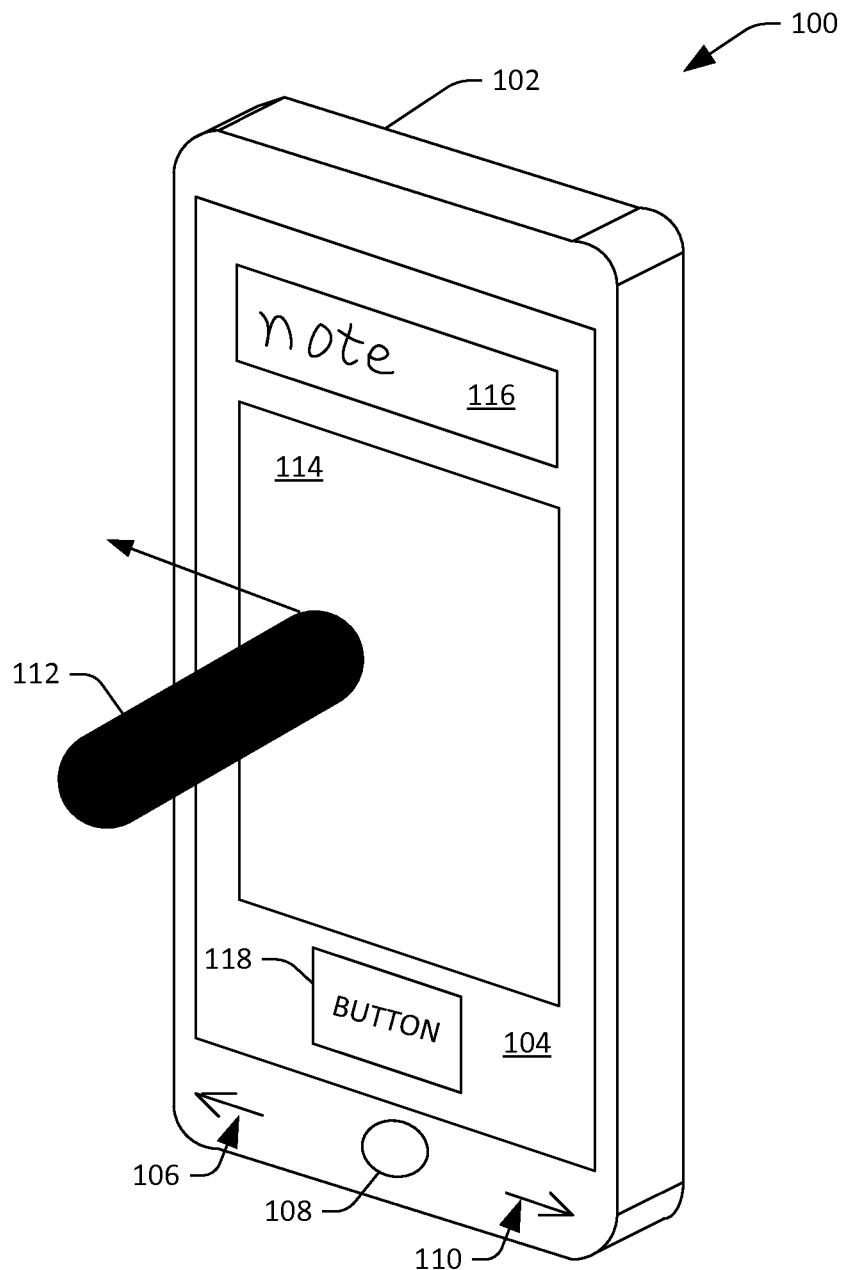
Figure 8:
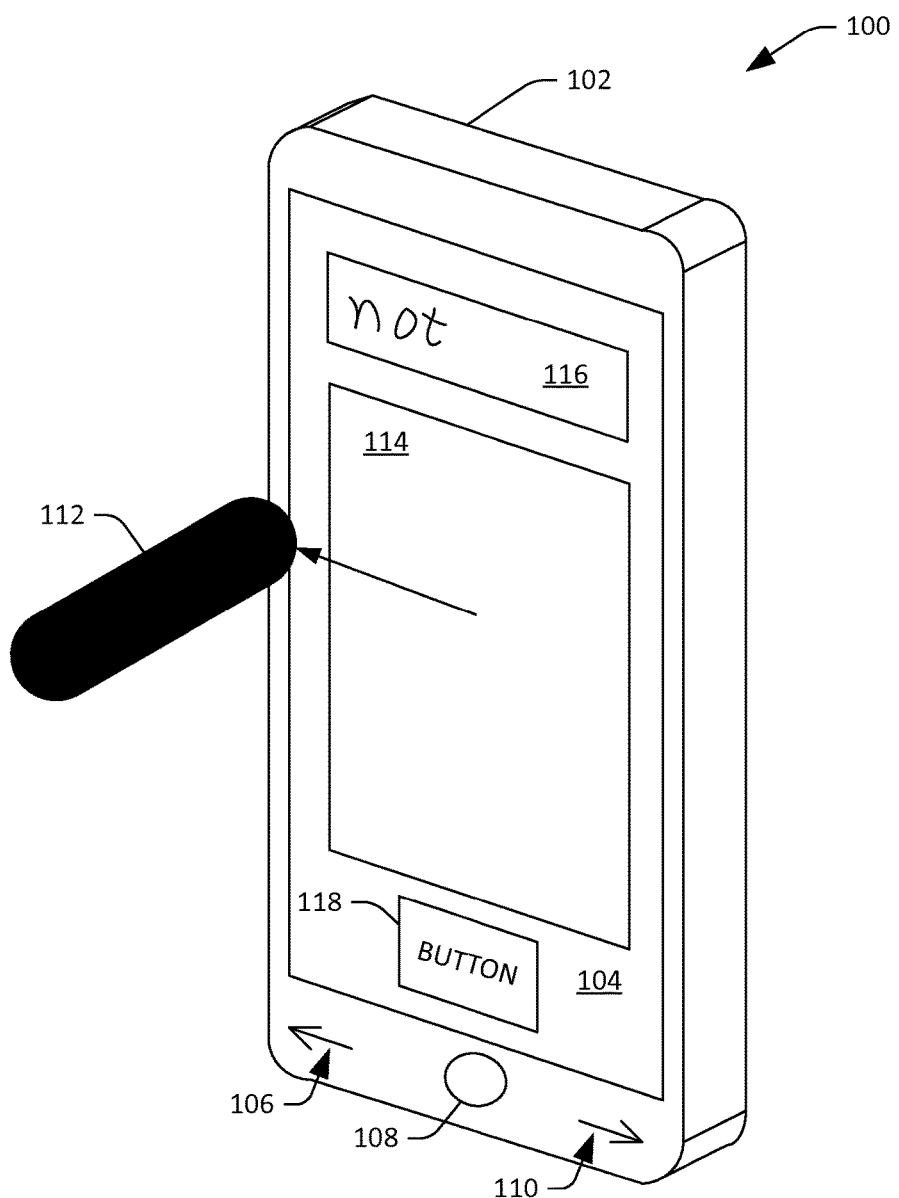

Now referring to FIG. 7, an exemplary illustration of the mobile computing device 100 when the user desires to delete a most recently displayed character in the display region 116 is shown. In the example depicted, the handwritten character "e" is the character (or stroke) most recently displayed in the display region 116. The user may set forth a particular gesture, such as transitioning the input mechanism 112 from inside the region 114 leftwardly out of the region 114 (e.g., a swipe). Turning to FIG. 8, deletion of the handwritten character "e" is completed responsive to the input mechanism 112 performing the aforementioned gesture on the touch-sensitive display screen 104.

Figure 9:
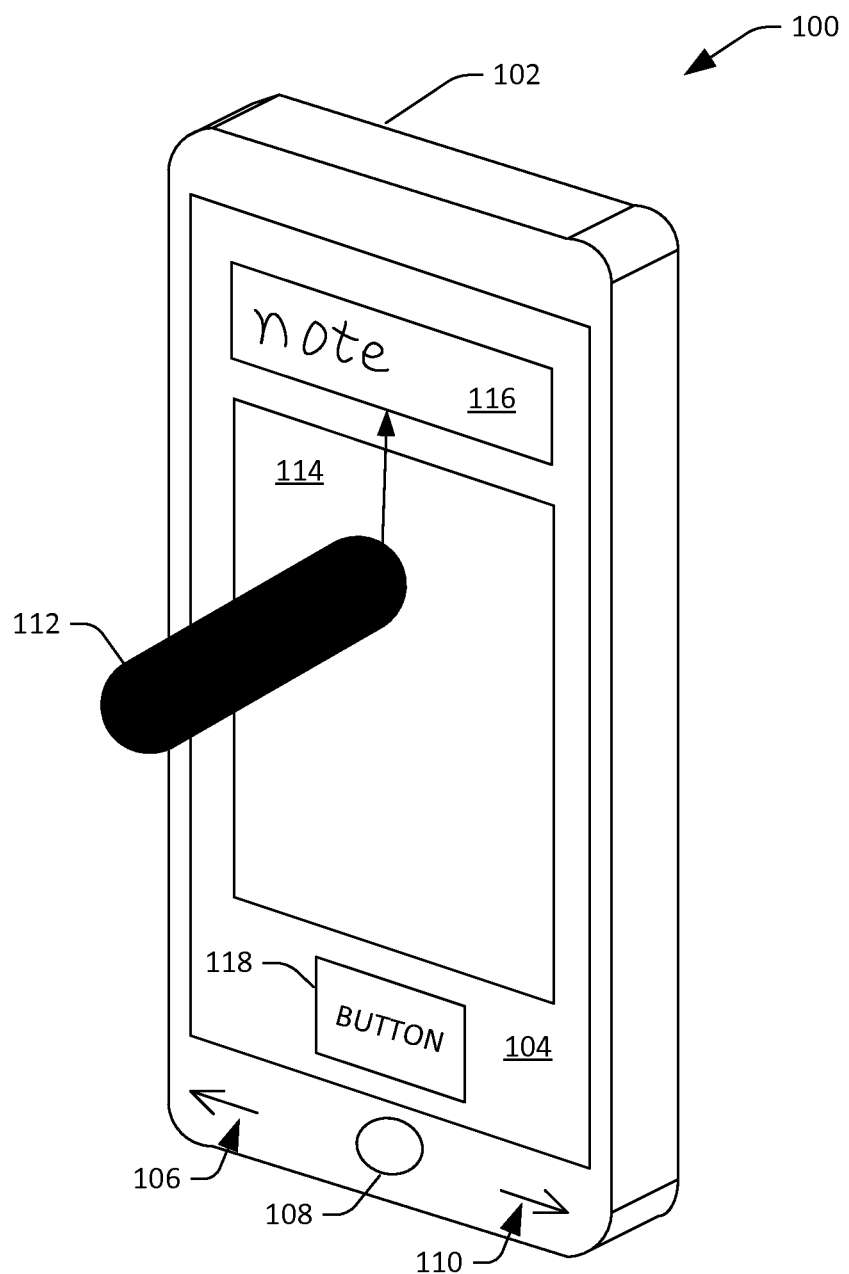
Figure 10:
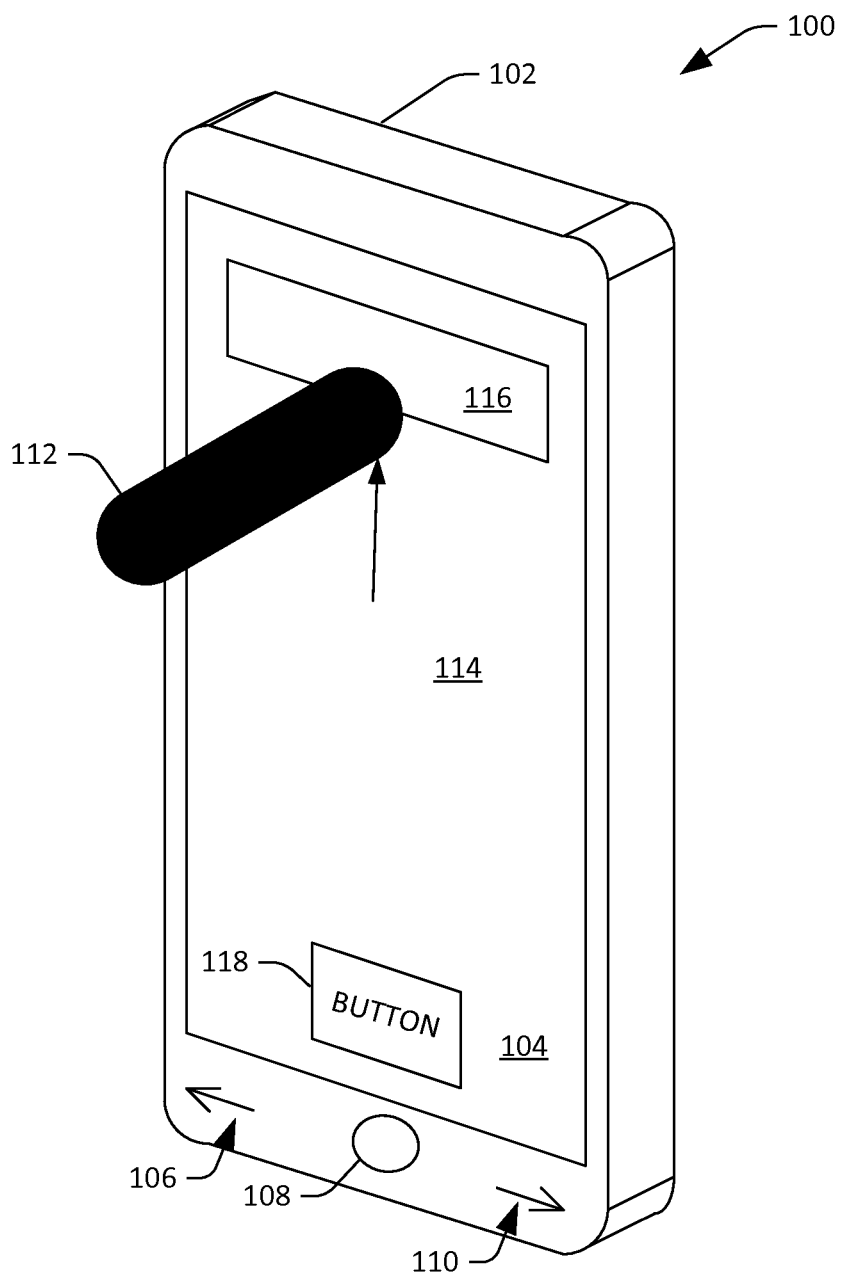

Now referring to FIG. 9, an exemplary illustration of the mobile computing device 100 when the user desires to delete a most recently displayed word in the display region 116 is depicted. For instance, the user may wish to delete the entirety of the word "note" from the message/annotation displayed in the display region 116. In an exemplary embodiment, the user can set forth a particular gesture, such as transitioning the input mechanism from inside the input region 114 vertically upwardly outside of the input region 114. Referring to FIG. 10, deletion of the word "note" is completed responsive to the input mechanism 112 being employed to perform such gesture.

Figure 11:
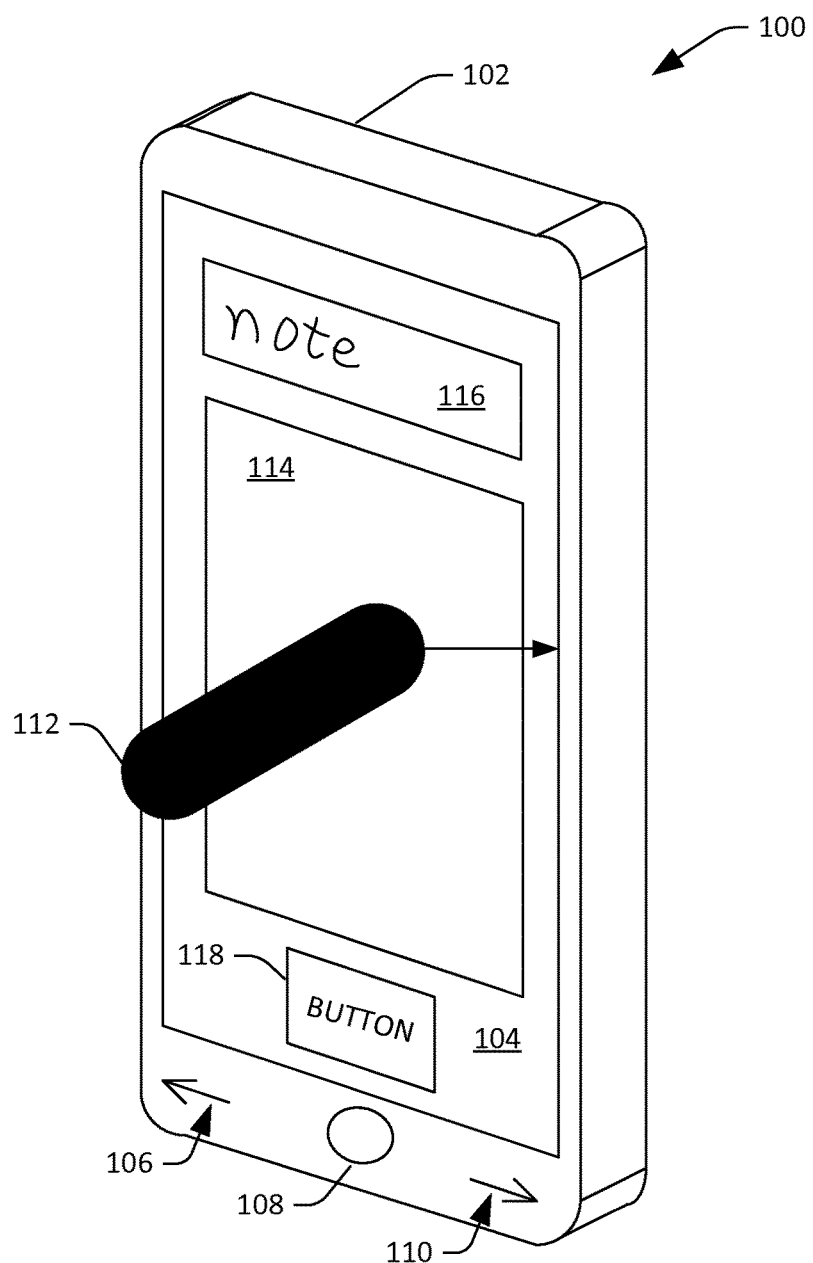

Now turning to FIG. 11, an exemplary illustration of the mobile computing device 100 when the user informs the mobile computing device 100 that an immediately subsequent stroke begins a new word is shown. Pursuant to an example, the user can employ the input mechanism 112 to transition from inside the input region 114 horizontally rightwardly out of the region 114 to inform the mobile computing device 100 that an immediately subsequently entered stroke corresponds to a next word (e.g., the word "note" is completed, and the next stroke corresponds to a new word).

Figure 12:
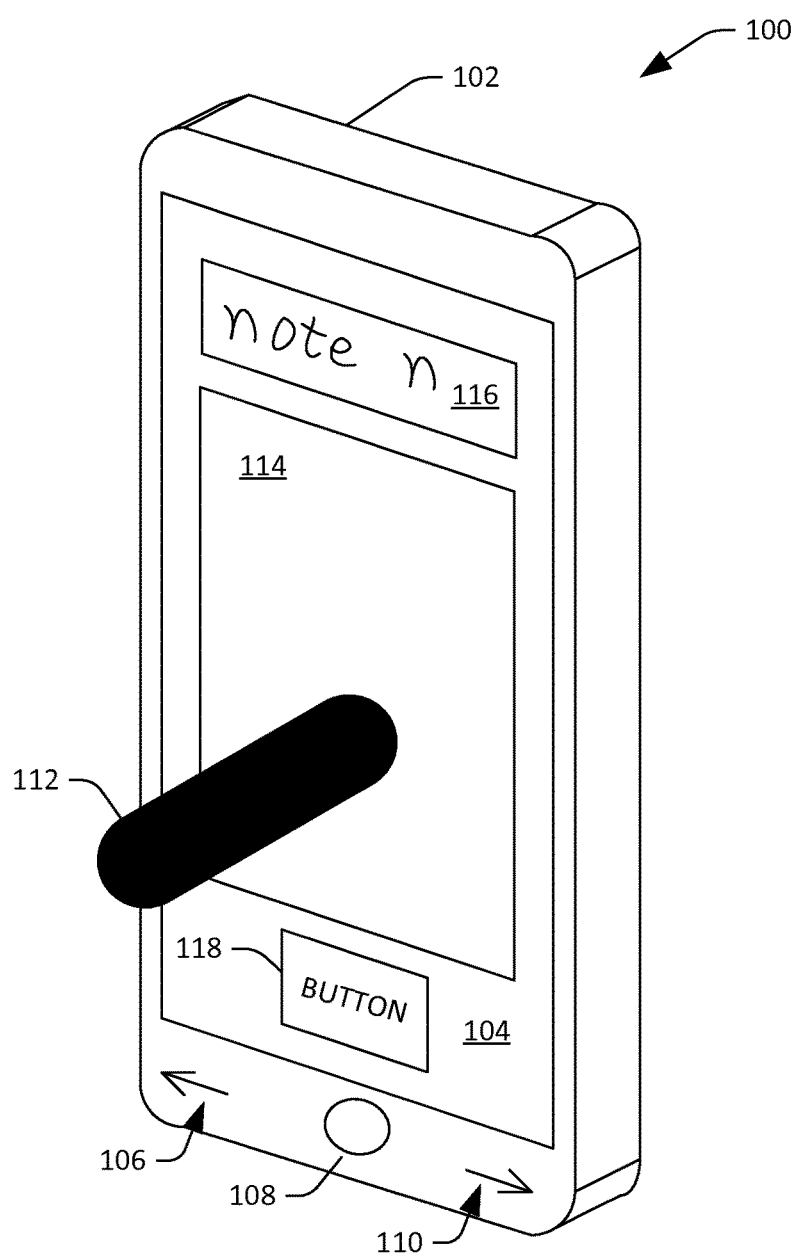

Now referring to FIG. 12, a space between the word "note" and a next character "n", is shown. Size of the space may be any suitable size that visually indicates that the character "n" begins another word.

Figure 13:
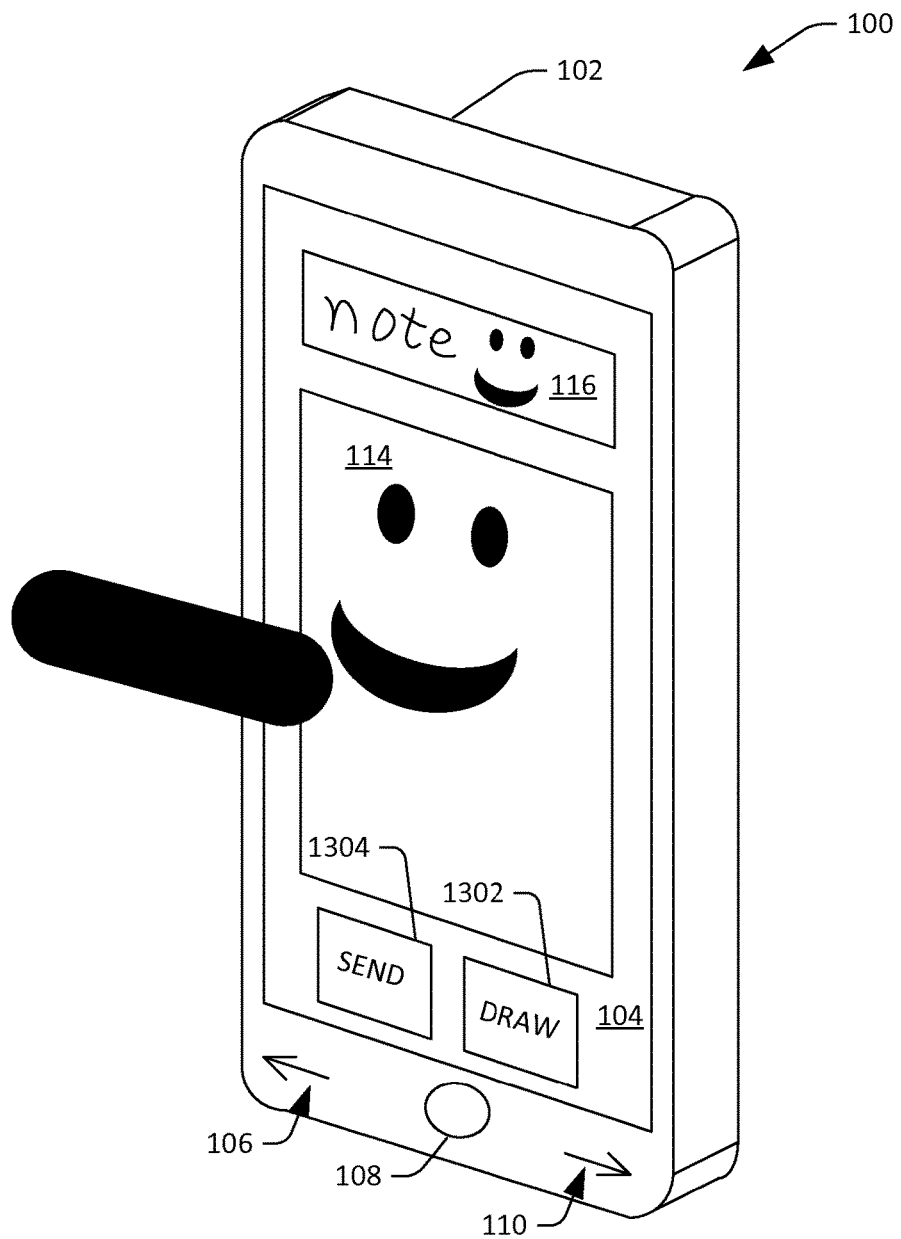

With reference to FIG. 13, an exemplary illustration of the mobile computing device 100 when a user thereof desires to include a freeform drawing in a message or annotation displayed in the display region 116 is shown. Pursuant to an example, a graphical user interface on the touch-sensitive display screen 104 can include a button 1302 that indicates that the user of the mobile computing device 100 desires to include a freeform drawing in the display region 116. In other words, once the button 1302 is depressed, the mobile computing device 100 is informed that an immediately subsequent stroke is a freeform drawing stroke that is to be displayed in the display region 116 in real-time, and is not to be subjected to stroke segmentation. In other embodiments, a different gesture can be employed to initiate the drawing mode (e.g. swiping vertically downwardly from inside of the input region 114 to outside of the input region 114). Other gesture/commands are also contemplated. The graphical user interface may also include a send button 1304, wherein the handwritten message shown in the display region 116 is sent to a contact of the user of the mobile computing device 100.

Figure 14:
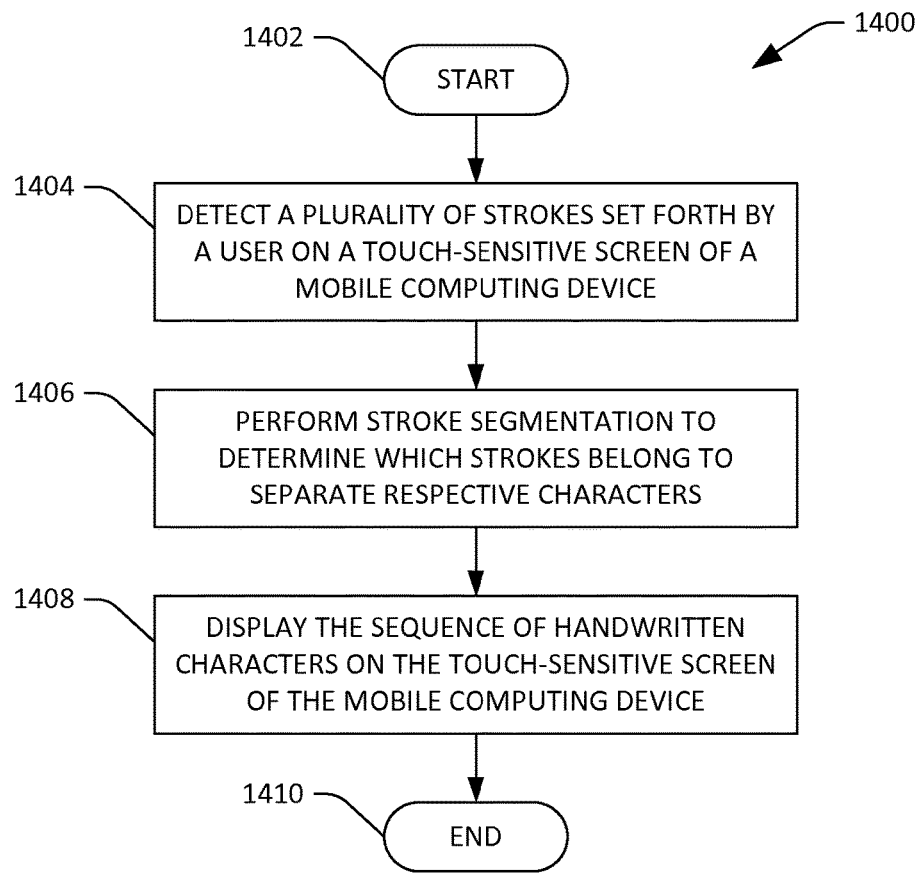
FIG. 14 is a flow diagram that illustrates an exemplary methodology for displaying a sequence of handwritten characters generated by a user via interaction with a touch-sensitive display of a mobile computing device.
Figure 15:
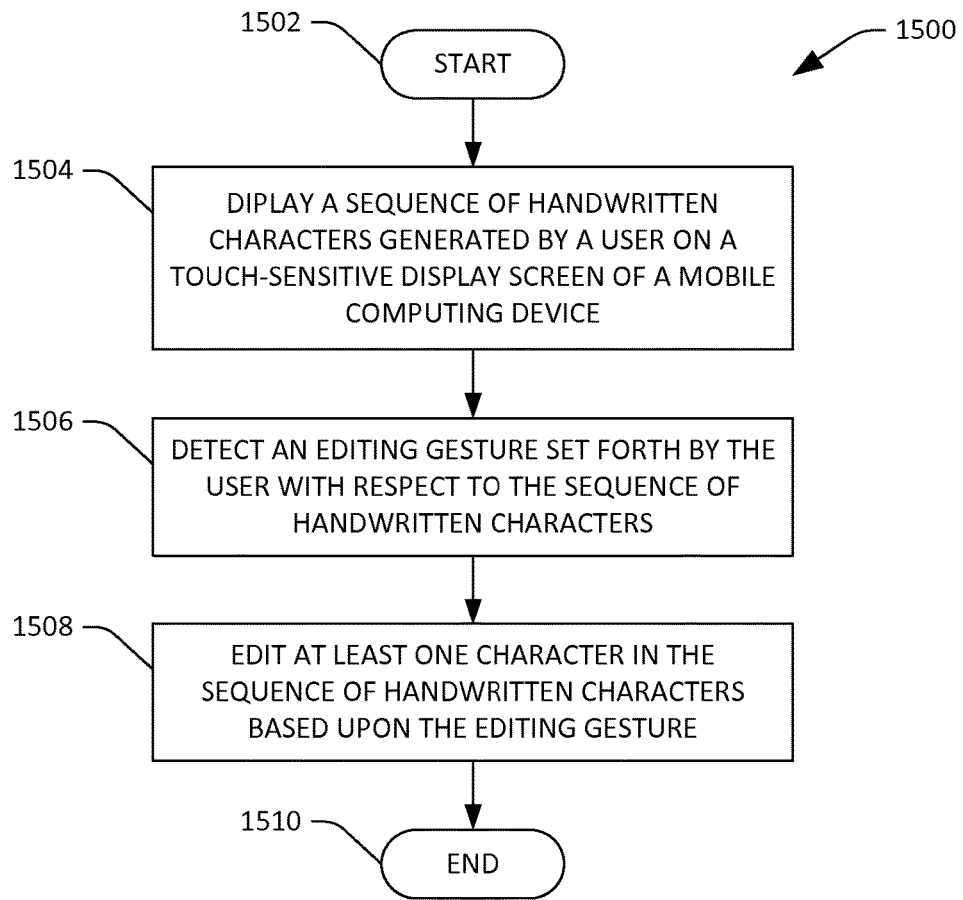
FIG. 15 is a flow diagram that illustrates an exemplary methodology for editing at least one handwritten character in a sequence of handwritten characters composed by way of a touch-sensitive display screen of a mobile computing device.
Figure 16:
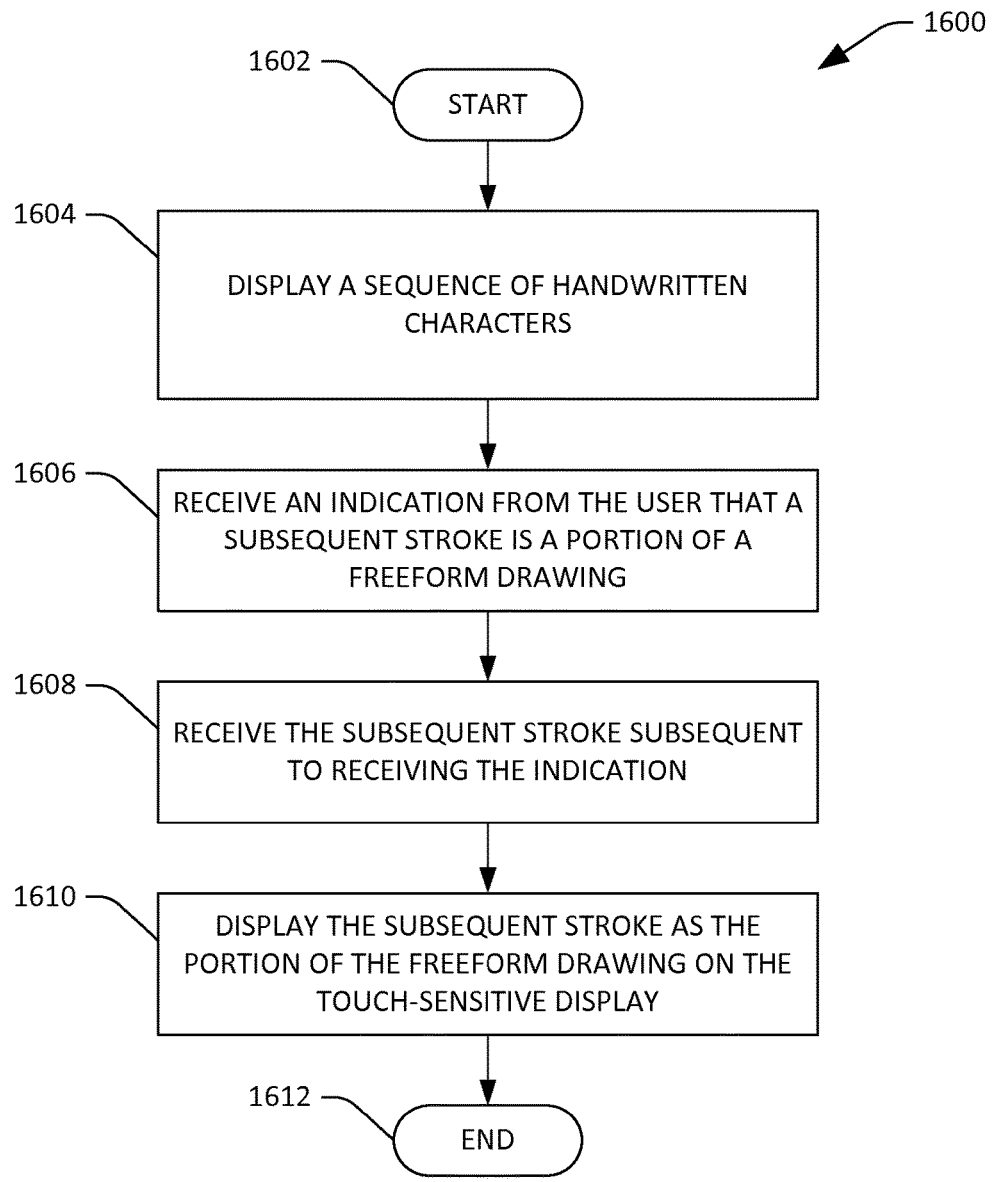
FIG. 16 is a flow diagram that illustrates an exemplary methodology for including a freeform drawing as a portion of a handwritten message or annotation, wherein the message or annotation is generated through user interaction with a touch-sensitive display screen of a mobile computing device.

With reference now collectively to FIGS. 14-16, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

With reference now solely to FIG. 14, an exemplary methodology 1400 that facilitates displaying a sequence of handwritten characters on a touch-sensitive display screen of a mobile computing device is illustrated. The methodology 1400 starts at 1402, and at 1404 a plurality of strokes set forth by user on a touch-sensitive display screen of a mobile computing device are detected. The plurality of strokes correspond to a sequence of handwritten characters that is desirably displayed on the touch-sensitive display screen of the mobile computing device, wherein a first stroke corresponds to a first character in the sequence of handwritten characters and a second stroke corresponds to a second character in the sequence of handwritten characters. As noted above, the first stroke and the second stroke are set forth by the user in a region of the touch-sensitive display screen such that at least a portion of the two strokes overlap. Furthermore, pursuant to an example, multiple strokes can be received to represent at least one of the first character or the second character.

At 1406, responsive to detecting the plurality of strokes set forth by the user on the touch sensitive display screen of the mobile computing device, stroke segmentation is performed to identify boundaries between strokes representing different characters. At 1408, the sequence of handwritten characters is displayed on the touch-sensitive display screen of the mobile computing device based at least in part upon the segmentation described above. The methodology 1400 completes 1410.

Turning now to FIG. 15, an exemplary methodology 1500 that facilitates editing at least one character in a sequence of handwritten characters is illustrated. The methodology 1500 starts at 1502, and at 1504 a sequence of handwritten characters generated by a user through utilization of a touch-sensitive display screen is displayed on the touch-sensitive display screen of the mobile computing device. At 1506, an editing gesture is detected as being set forth by the user with respect to at least one character in the sequence of handwritten characters. At 1508, at least one character in the sequence of handwritten characters is edited based at least in part upon the editing gesture. For example, a character displayed improperly due to a segmentation error can be corrected. The methodology 1500 completes at 1510.

With reference now to FIG. 16, an exemplary methodology 1600 that facilitates including a freeform drawing in a handwritten message or annotation generated by way of a touch-sensitive display screen of a mobile computing device is illustrated. The methodology starts 1602, and at 1604 a sequence of handwritten characters is displayed on a touch-sensitive display screen of a mobile computing device. At 1606, an indication is received from the user that a subsequent stroke is a portion of a freeform drawing that is desirably to be included in a message or annotation that includes the sequence of handwritten characters.

At 1608, the subsequent stroke is received immediately subsequent to receiving the indication. At 1610, the subsequent stroke is displayed as the portion of the freeform drawing on the touch-sensitive display screen. The methodology 1600 completed 1612.

Figure 17:
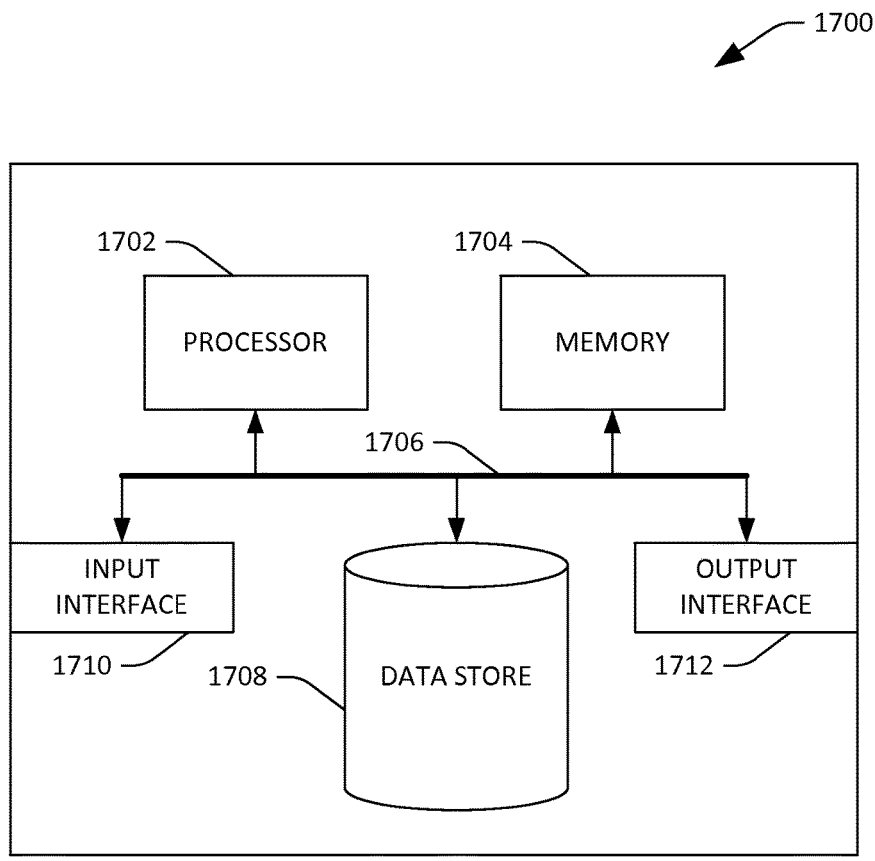
FIG. 17 is an exemplary computing system.

Now referring to FIG. 17, a high-level illustration of an exemplary computing device 1700 that can be used in accordance with the systems and methodologies disclosed herein is illustrated. For instance, the computing device 1700 may be used in a system that supports composing handwritten messages by way of a touch-sensitive display screen of a mobile computing device. In another example, at least a portion of the computing device 1700 may be used in a system that supports composing a handwritten annotation that is to be applied to a document or image by way of a touch-sensitive display screen of a mobile computing device. The computing device 1700 includes at least one processor 1702 that executes instructions that are stored in a memory 1704. The memory 1704 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1702 may access the memory 1704 by way of a system bus 1706. In addition to storing executable instructions, the memory 1704 may also store models utilized in connection with segmentation, training data, etc.

The computing device 1700 additionally includes a data store 1708 that is accessible by the processor 1702 by way of the system bus 1706. The data store 1708 may be or include any suitable computer-readable storage, including a hard disk, memory, etc. The data store 1708 may include executable instructions, saved handwritten annotations, etc. The computing device 1700 also includes an input interface 1710 that allows external devices to communicate with the computing device 1700. For instance, the input interface 1710 may be used to receive instructions from an external computer device, from a user, etc. The computing device 1700 also includes an output interface 1712 that interfaces the computing device 1700 with one or more external devices. For example, the computing device 1700 may display text, images, etc. by way of the output interface 1712.

Additionally, while illustrated as a single system, it is to be understood that the computing device 1700 may be a distributed system. Thus, for instance, several devices may be in communication by way of a network connection and may collectively perform tasks described as being performed by the computing device 1700.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method executed on a mobile computing device, the method comprising:
   detecting a plurality of strokes set forth on a touch-sensitive screen of the mobile computing device, wherein the plurality of strokes correspond to a sequence of handwritten characters that form a word that is to be displayed on the display screen of the mobile computing device, wherein the sequence of handwritten characters comprises a first character immediately followed by a second character, a first stroke for the first character and a second stroke for the second character are set forth in a region of the touch-sensitive screen and at least partially overlap with one another such that the second character is set forth on top of the first character in the region, and wherein multiple strokes are received to represent at least one of the first character or the second character;
   responsive to the detecting of the plurality of strokes on the touch-sensitive display screen of the mobile computing device, automatically identifying that the first stroke is for the first character and the second stroke is for the second character;
   responsive to identifying that the first stroke is for the first character and the second stroke is for the second character, presenting the sequence of handwritten characters on the touch-sensitive screen of the mobile computing device;
   receiving a command that indicates that a next stroke set forth is for a handwritten character that belongs to a second word;
   subsequent to receiving the command, receiving the next stroke; and
   displaying the word and the handwritten character that belongs to the second word on the display screen such that the word and the handwritten character that belongs to the second word are separated by a space that visually indicates that the word fails to include the handwritten character that belongs to the second word.

2. The method of claim 1, wherein the mobile computing device is a mobile telephone.

3. The method of claim 1, wherein the word is a portion of a message that is to be transmitted to another user, the method further comprising:
   receiving a command from a user of the mobile computing device to transmit the message to the another user; and
   responsive to receiving the command, transmitting the message to a computing device of the another user.

4. The method of claim 1, wherein the command is a gesture.

5. The method of claim 1, further comprising:
   receiving a command that at least one of the written character that belongs to the second word has been displayed improperly; and
   responsive to receiving the command that the handwritten character that belongs to the second word has been displayed improperly, identifying a most probable correction; and
   displaying the most probable correction on the touch-sensitive display screen.

6. The method of claim 5, wherein the command is a tap gesture on the handwritten character that belongs to the second word that is improperly displayed.

7. The method of claim 1, further comprising:
   receiving a command that the handwritten character that belongs to the second word is to be deleted; and
   removing the handwritten character that belongs to the second word from the touch-sensitive display screen responsive to receiving the command.

8. The method of claim 7, wherein the command is a swipe of a finger horizontally on the touch-sensitive display screen.

9. The method of claim 1, further comprising:
   receiving a command that indicates that a next stroke to be received is for a freeform drawing;
   receiving the next stroke by way of the touch-sensitive display screen; and
   displaying the next stroke as at least a portion of the freeform drawing on the touch-sensitive display screen.

10. The method of claim 9, wherein the command is a swipe of a finger vertically on the touch-sensitive display screen.

11. A mobile computing device, comprising:
    a touch-sensitive display screen;
    at least one processor; and memory that comprises instructions that, when executed by the at least one processor, cause the at least one processor to perform acts comprising:

detecting a first stroke, a stroke being an uninterrupted movement of a finger over the touch-sensitive display screen while maintaining contact with the touch-sensitive display screen, the first stroke being for a first handwritten character that is to be composed, and the first stroke entered on a region of the touch-sensitive display screen; and detecting a second stroke, the second stroke being for a second handwritten character to be composed immediately subsequent to the first handwritten character, the second stroke entered on the region of the touch-sensitive display screen such that the second handwritten character is set forth on top of the first handwritten character;

determining that the first stroke is for the first handwritten character and the second stroke is for the second handwritten character based upon the detecting of the first stroke and the detecting of the second stroke;

based upon determining that the first stroke is for the first handwritten character and the second stroke is for the second handwritten character, displaying a word on the touch-sensitive display screen, the word includes the first handwritten character and the second handwritten character immediately adjacent to one another, the word reflecting handwriting of a user of the mobile computing device;

receiving a command that indicates that a next stroke set forth is for a third handwritten character that belongs to a second word;

subsequent to receiving the command, receiving the next stroke; and displaying the word and the third handwritten character that belongs to the second word on the display screen such that the word and the third handwritten character are separated by a space that visually indicates that the word fails to include the third handwritten character.

12. The mobile computing device of claim 11 being a mobile telephone.

13. The mobile computing device of claim 11, wherein size of the touch-sensitive display screen is less than 3.5 inches in width and less than 5.5 inches in height.

14. The mobile computing device of claim 11, wherein a computer-executable messaging application, when executed by the at least one processor, performs the acts, the acts further comprising transmitting the handwritten note to a computing device of a contact of the user of the mobile computing device.

15. The mobile computing device of claim 14, the acts further comprising:

receiving a computer-implemented handwritten note from the contact of the user; and displaying the computer-implemented handwritten note from the contact of the user on the touch-sensitive display screen.

16. The mobile computing device of claim 11, the acts further comprising:

receiving an indication that the third handwritten character is improperly displayed; and automatically correcting the third handwritten character.

17. The mobile computing device of claim 16, wherein the indication is a tap of a finger on the third handwritten character as displayed on the touch-sensitive display screen.

18. The mobile computing device of claim 11, the acts further comprising:

receiving an indication that the user wishes to include a free-form drawing in a handwritten note that includes the word; and causing strokes set forth by the user to be included as the free-form drawing in the handwritten note.

19. A computer-readable medium comprising instructions that, when executed by a processor, cause the processor to perform acts comprising:

receiving a first stroke on a touch-sensitive display screen of a mobile computing device, a stroke being a transition of a finger over the touch-sensitive display screen while maintaining contact with the touch-sensitive display screen, the first stroke corresponding to a first handwritten character, the first stroke occurring in a region of the touch-sensitive display screen of the mobile computing device;

receiving a second stroke on the touch-sensitive display screen of the mobile computing device, the second stroke corresponding to a second handwritten character that is to be immediately adjacent to the first handwritten character in a sequence of handwritten characters that form a word, the second stroke occurring in the region of the touch-sensitive display screen of the mobile computing device such that the second handwritten character is written on top of the first handwritten character;

performing stroke segmentation over strokes corresponding to the sequence of handwritten characters to determine that the first stroke corresponds to the first handwritten character and the second stroke corresponds to the second handwritten character;

receiving a command that indicates that a next stroke set forth is for a third handwritten character that belongs to a second word;

subsequent to receiving the command, receiving the next stroke; and displaying the word and the third handwritten character that belongs to the second word on the display screen such that the word and the third handwritten character are separated by a space that visually indicates that the word fails to include the third handwritten character.

20. The computer-readable medium of claim 19, wherein a handwritten message includes the first word and the second word, the acts further comprising:

receiving an indication that the handwritten message is to be transmitted to a contact of a user of the mobile computing device; and transmitting the handwritten message to the contact of the user responsive to receiving the indication.

\* \* \* \* \*